G. F. JASPER.
Feed-Water Heaters and Filterers.
No 157,334. Patented Dec. 1, 1874.
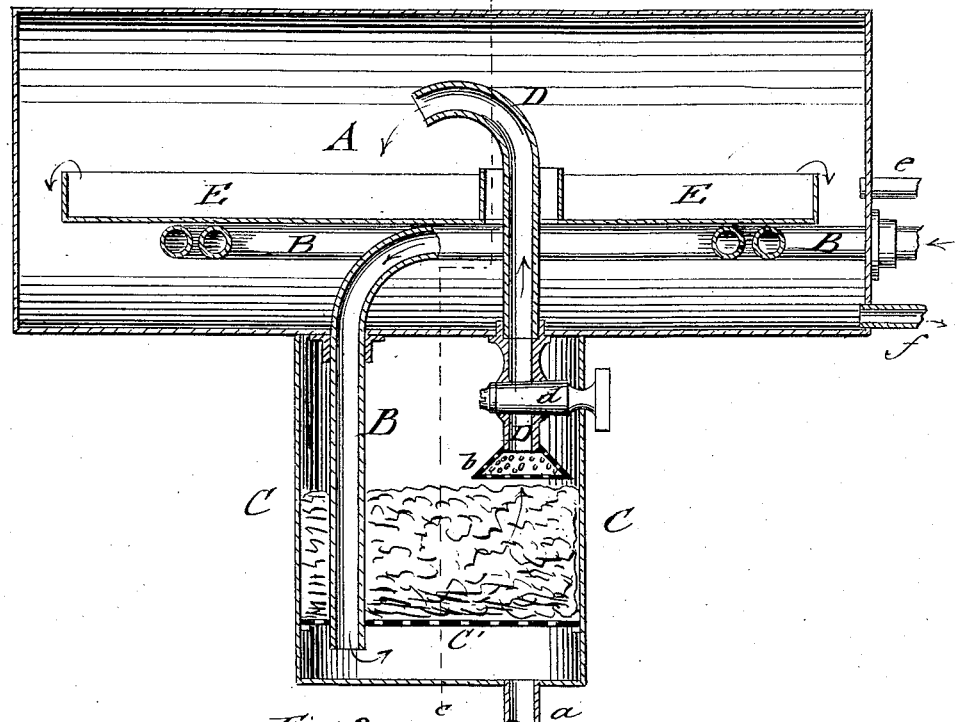
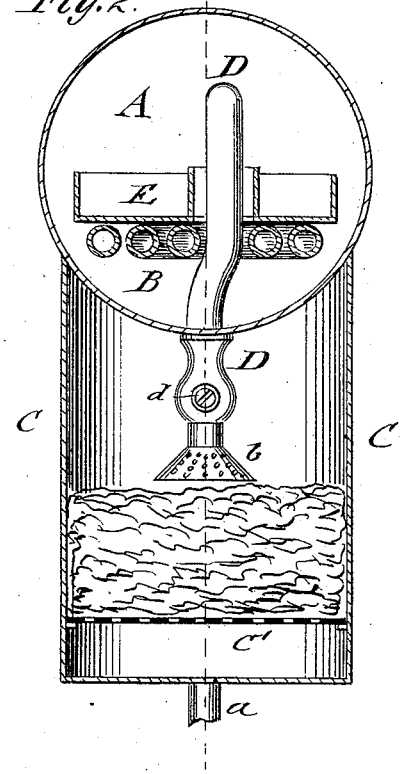
WITNESSES:
E. Wolff
A. F. Terry
INVENTOR:
G. F. Jasper
BY
ATTORNEYS.

UNITED STATES PATENT OFFICE.

GEORG F. JASPER, OF FREEBURG, ILLINOIS.

IMPROVEMENT IN FEED-WATER HEATERS AND FILTERS.

Specification forming part of Letters Patent No. 157,334, dated December 1, 1874; application filed October 24, 1874.

*To all whom it may concern:*

Be it known that I, GEORG F. JASPER, of Freeburg, in the county of St. Clair and State of Illinois, have invented a new and useful Improvement in Feed-Water Heaters and Filters, of which the following is a specification:

In the accompanying drawing, Figure 1 represents a vertical longitudinal section of my improved feed-water heater and filter; and Fig. 2, a vertical transverse section of the same on the line *c c*, Fig. 1.

Similar letters of reference indicate corresponding parts.

The invention relates to an improvement in the class of feed-water heaters and filters for stationary engines wherein the supply-pipe passes downward through and beneath the filtering material, and the water discharged therefrom passes upward through the said material, and flows over into a series of sediment troughs or pans, and thence into the heating-tank proper, from which it is conveyed to the boiler. The improvement relates to the arrangement of the supply-coil and sediment-pan in the heating-tank, and of the filter chamber or receptacle below the tank, as hereinafter described.

In the drawing, A represents the feed-water-heating tank, which is constructed of any suitable size or shape, according to the quantity required to be furnished to the boiler.

Tank A is heated up either by steam, or by the direct action of the fire from the furnace, or in any other suitable manner, the water being introduced from the receptacle or pump by a pipe, B, which is coiled inside of the tank in a suitable manner, and bent to support the sediment-pan E, and take up more or less heat from the water in the tank, and is bent in downward direction, passing through the bottom of the tank A into a filtering-receptacle, C, below the same. Pipe B is extended through the hay, charcoal, or other filtering material to a point below the perforated supporting-bottom C', into a space or chamber below the same, discharging the water at some distance from the solid bottom, so as to compel its passage, in upward direction, through the filtering material, retaining the mud and other impurities in the lower chamber, to be drawn off from time to time by a mud-valve, *a*, as required.

This arrangement of the filter C below the tank increases the surface available for application of heat in the furnace, when desired or necessary, as well as gives easy access to it for removal of the sediment when the furnace is fired up.

The filtering material is removed from time to time through a man-hole of the receptacle C. The filtered water is taken up by a pipe, D, which is placed at a suitable height in the lower receptacle C, and provided with a conical perforated mouth, *b*, and a stop-valve, *d*, and conducted, in an upward direction, back into the heating-tank, to be there discharged into a pan, E. Such impurities as were accidentally carried up from the filter by the pressure of the feed-water are deposited in pan E.

The continually overflowing water in pan E fills the heating-tank up to a waste-pipe, *e*, below the level of the pan, for regulating the quantity of water in the tank, and keeping up the action of the same. An exit-pipe feeds the filtered and heated water to the boiler, rendering the same thereby more effective and economical, and requiring less frequent cleaning and repairs.

Having thus described my invention, I claim as new and desire to secure by Letters Patent—

1. In a feed-water heater and filter, the combination of the horizontal coil B and sediment-pan E supported thereon, the same being arranged within the tank A, as shown and described.

2. The combination of the filter-receptacle C, arranged below the heating-tank A, the supply-pipe B, and vertical return-pipe D, passing up through the pan E, and discharging into the same, all as shown and described.

GEORG F. JASPER.

Witnesses:
PHILIPP SCHADER,
JACOB SKAER.